United States Patent [19]

Sasamoto

[11] Patent Number: 4,511,186

[45] Date of Patent: Apr. 16, 1985

[54] SPROCKET WHEEL ASSEMBLY OF ENDLESS TRACK-TYPE VEHICLES

[75] Inventor: Tatsuya Sasamoto, Tokyo, Japan

[73] Assignee: Kabushiki Kaisha Komatsu Seisakusho, Tokyo, Japan

[21] Appl. No.: 497,646

[22] Filed: May 24, 1983

[51] Int. Cl.³ ............................................. B62D 55/12
[52] U.S. Cl. ...................................... 305/57; 474/161; 474/901; 152/41; 152/47
[58] Field of Search .................. 474/161, 901; 152/18, 152/41, 47; 305/21, 29, 31, 57

[56] References Cited

U.S. PATENT DOCUMENTS

| Re. 23,161 | 10/1949 | MacLean | 152/41 |
|---|---|---|---|
| 1,472,594 | 10/1923 | Green | 152/18 |
| 2,800,357 | 7/1957 | Boschi | 152/41 X |
| 3,730,013 | 5/1973 | Slemmons | 474/901 X |
| 4,106,822 | 8/1978 | Lee | 305/57 X |
| 4,332,573 | 6/1982 | Uchida et al. | 474/161 X |

FOREIGN PATENT DOCUMENTS 852509 2/1940 France ................................. 152/41

Primary Examiner—David A. Scherbel
Attorney, Agent, or Firm—Frost & Jacobs

[57] ABSTRACT

A sprocket wheel assembly of a crawler vehicle which comprises a first inner tube mounted on a drive shaft, a second inner tube rotatably mounted on a final reduction gear casing and fixedly connected with the first inner tube, and an outer tube disposed so as to extend over the outer circumferences of the first and second inner tubes. A first elastic annular block unit is interposed between the first annular tube and one end section of the outer tube and a second elastic annular block unit is interposed between the second inner tube and the other end section of the outer tube. A sprocket wheel for driving a linked-together endless track is fixedly mounted to the outer tube.

5 Claims, 9 Drawing Figures

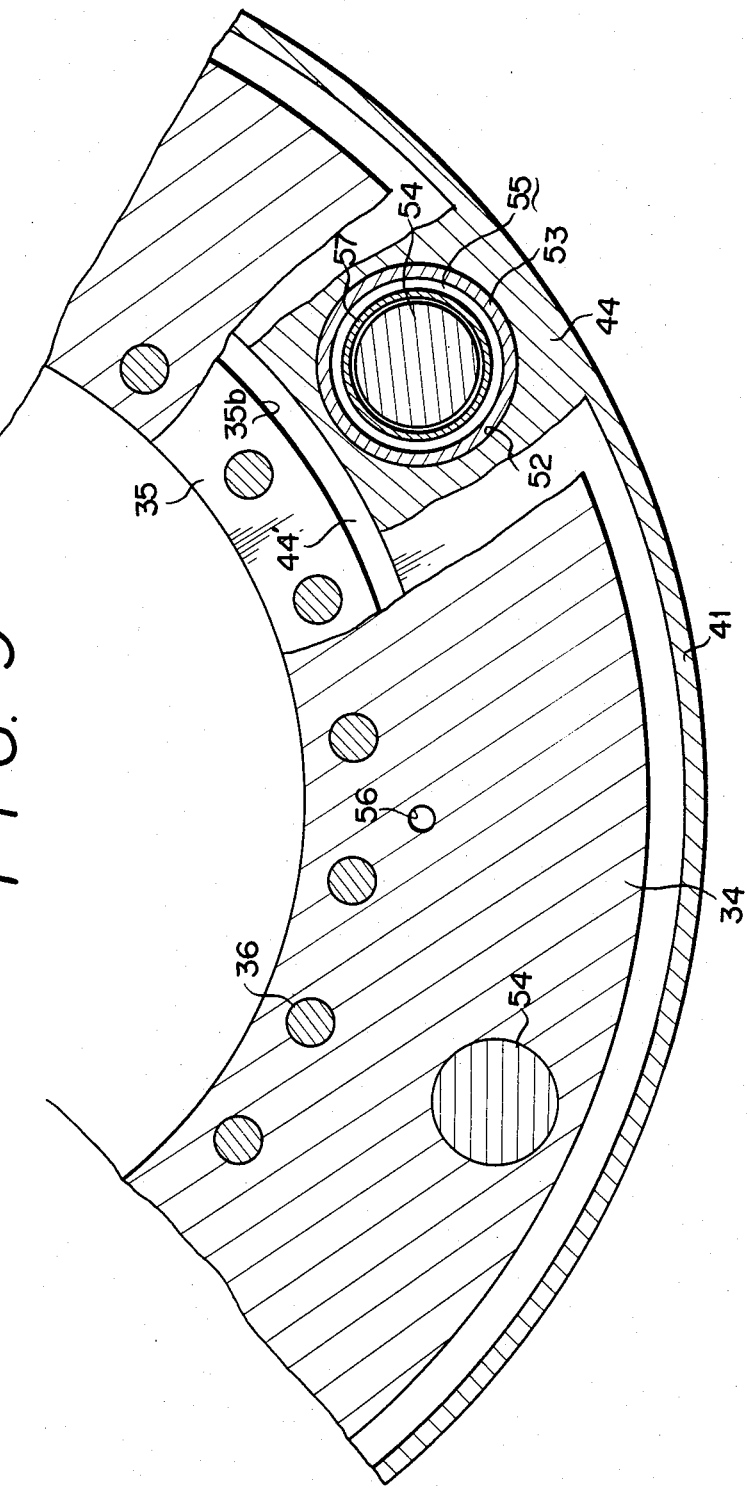

SPROCKET WHEEL ASSEMBLY OF ENDLESS TRACK-TYPE VEHICLES

BACKGROUND OF THE INVENTION

1. Field of the Invention

This invention relates to a sprocket wheel assembly of an endless track-type-vehicle, more particularly to a sprocket wheel assembly which can absorb or reduce noise and shock at or above a preselected magnitude caused, for example, by running on a ragged ground.

2. Description of the Prior Art

During travel of an endless-track-type vehicle on a ragged ground, drive and/or driven sprocket wheels of the endless track-type vehicle are often subjected to severe impacts from other elements which are used to drive or be driven by the wheels. These repeated severe impacts sometimes generate damaging forces, undesirable wear rate, and noise which result in wastes of endless-track bushings, speed reduction gears, bearings, etc. The wastes of these elements tend to be expedited in proportion to an increase of weight of the vehicle.

In order to eliminate the above disadvantages, some measures have been proposed as shown in U.S. Pat. Nos. 4,022,072, 4,069,856, 4,080,008 and 4,332,573 so far as the applicant knows. However, the prior art disclosed in these patents is not sufficient to completely deal with the aforesaid disadvantages.

SUMMARY OF THE INVENTION

It is therefore an object of the present invention to provide an improved sprocket wheel assembly of an endless track-type vehicle which can sufficiently deal with torque fluctuations and severe impacts at or above preselected magnitude applied thereto.

Another object of the present invention is to provide a sprocket wheel assembly which can effectively absorb severe impacts applied thereto and reduce a noise of operation.

A further object of the present invention is to provide a sprocket wheel assembly wherein assemblage of parts is significantly simplified.

In accordance with an aspect of the present invention, there is provided a sprocket wheel assembly of a crawler vehicle including a drive shaft and a final reduction gear casing, comprising: a first inner tube mounted on said drive shaft, said first inner tube having formed therein at one end thereof a flange extending radially inwardly and outwardly, said flange having formed therein a plurality of first holes in the outwardly extending flange portion; a second inner tube rotatably mounted on said final drive gear casing, said second inner tube being fixedly connected with said first inner tube and having formed therein a flange extending radially outwardly, the flange of said second inner tube having formed therein a plurality of second holes each being in register with said respective first holes; an outer tube disposed so as to extend outer circumferences of said first and second inner tubes, said outer tube having a first cylindrical section formed at one end thereof, a second cylindrical section formed at the other end thereof, a protrusion extending radially inwardly from an intermediate section thereof, and a flange extending radially outwardly from the intermediate section thereof, said protrusion being adapted to be inserted between the flanges of said first and second inner tubes and having formed therein a plurality of third holes each being in register with said respective first and second holes, diameter of said third holes being made larger than that of said first and second holes; a first elastic annular block unit interposed between said first inner tube and the first cylindrical section of said outer tube; a second elastic annular block unit interposed between said second inner tube and the second cylindrical section of said outer tube; a sprocket wheel fixedly mounted to the flange of said outer tube; and a plurality of pins each inserted into said respective first and second holes across said third holes defining an annular gap between the outer periphery of each of said pins and the inner periphery of each of said third holes.

The above and other objects, features and advantages of the present invention will be readily apparent from the following description taken in conjunction with the accompanying drawings.

BRIEF DESCRIPTION OF THE DRAWINGS

FIG. 9 is a sectional view, partly broken away for clarity, taken along the line IX—IX of FIG. 8.

DESCRIPTION OF PREFERRED EMBODIMENTS

Preferred embodiments of a sprocket wheel assembly according to the present invention will be described hereinafter in connection with the accompanying drawings.

Figure 1:
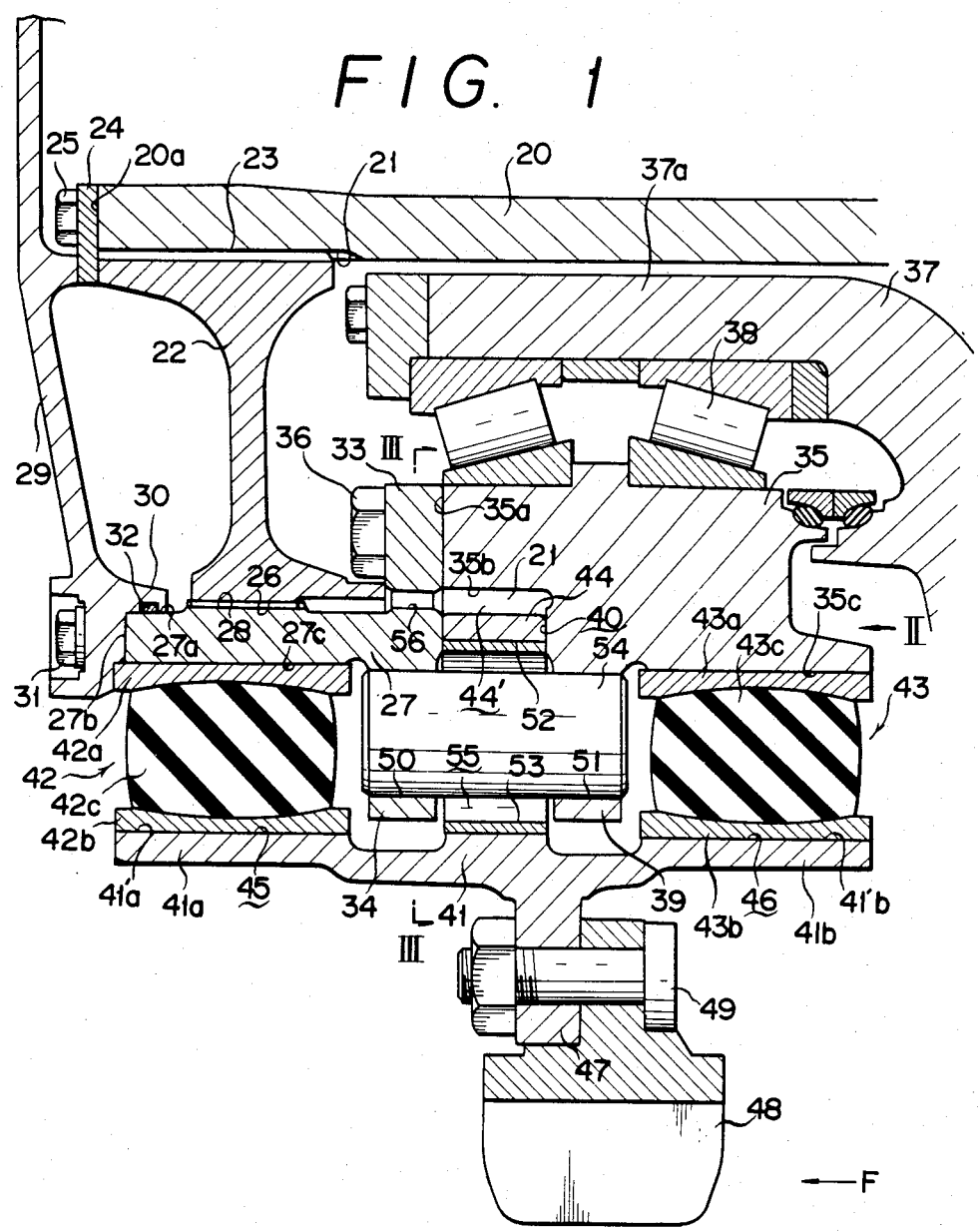
FIG. 1 is a fragmentary longitudinal sectional view of a sprocket wheel assembly according to the present invention.
Figure 2:
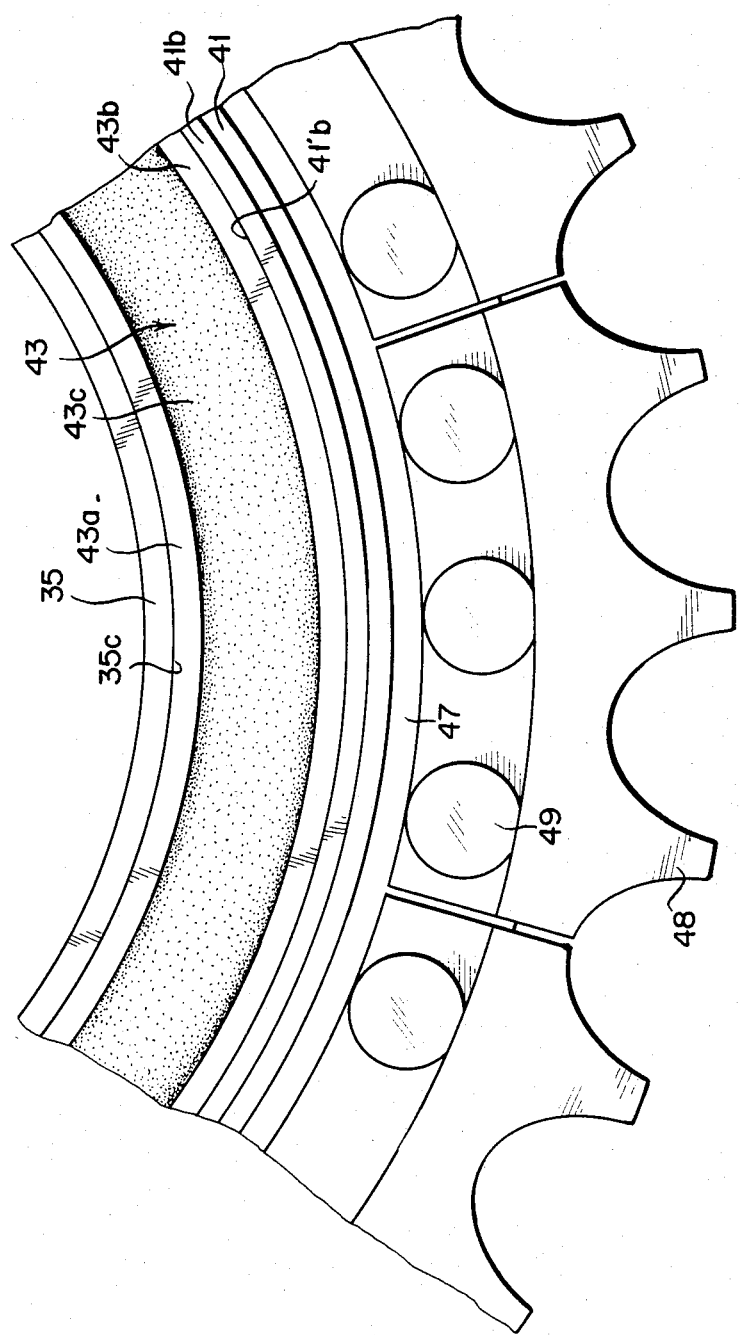
FIG. 2 is a side elevational view as seen from the arrow II with the final reduction gear casing being omitted.
Figure 3:
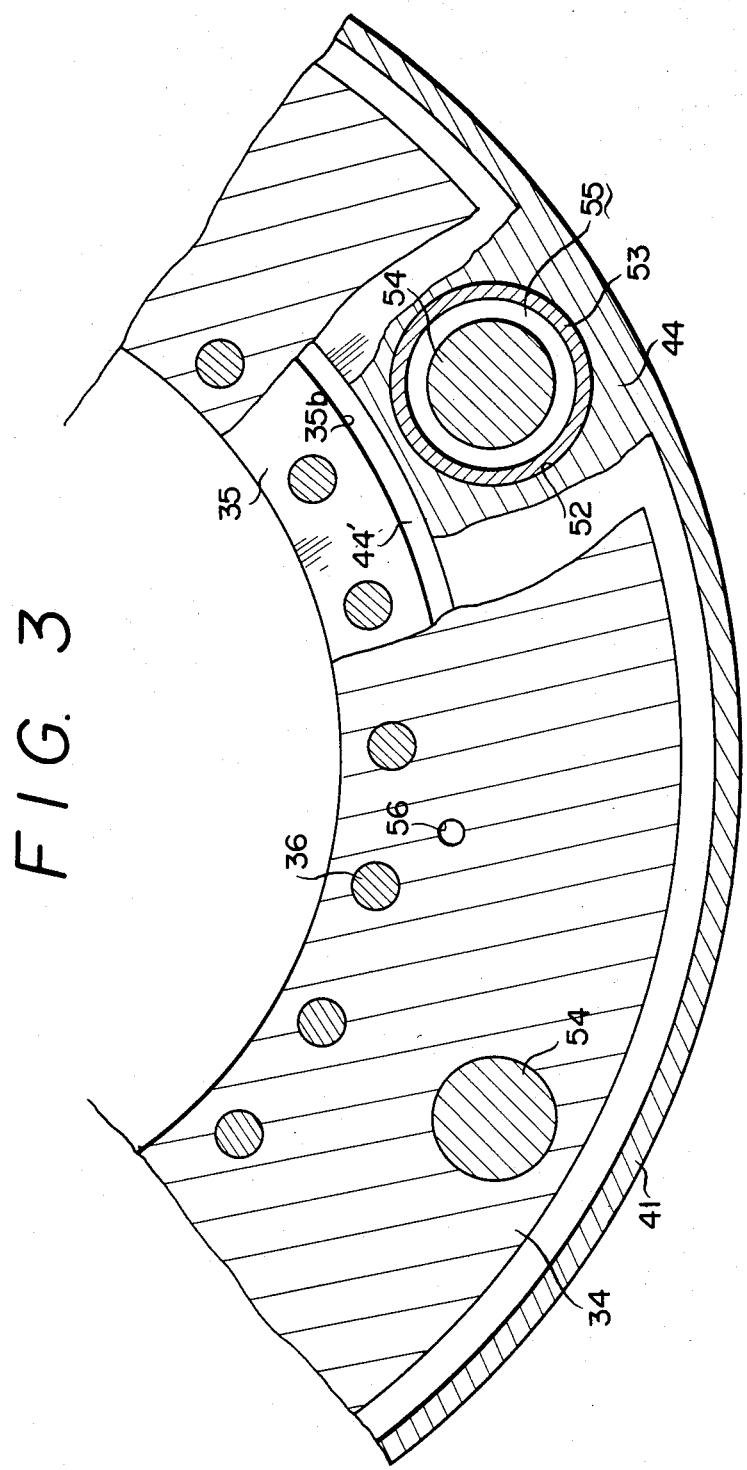
FIG. 3 is a sectional view, partly broken away for clarity, taken along the line III—III of FIG. 1.

Referring first to FIGS. 1 to 3, a tubular driving shaft 20 is coupled with a final reduction gear, not shown. Splines 21 are formed in the outer circumference of the free end portion of the driving shaft 20. The splined end of the driving shaft 20 is fitted in the internally splined bore 23 of a power transmission member 22. A holding plate 24 is fastened with bolts 25 to the end surface 20a of the driving shaft 20 to prevent the power transmission member 22 from falling off from the driving shaft 20.

Splines 26 are formed in the outer circumference of the power transmission member 22. The splines 26 are engaged with internal splines formed in the internally splined bore 28 of a first inner tube 27. The flange 30 of a cover 29 is fitted in one end of the first inner tube 27 so as to be closely received by the inner circumference 27a. The cover 29 is fastened with bolts 31 to the end surface 27b of the first inner tube 27. Reference numeral 32 designates an O-ring.

An inward flange 33 and an outward flange 34 are formed integrally with the other end portion of the first inner tube 27. The inward flange 33 is fastened with bolts 36 to one end surface 35a of a second inner tube 35.

The second inner tube 35 is supported rotatably through a bearing 38 by the cylindrical part 37a of a casing 37 of the final reduction gear. An outward flange 39 is formed integrally in the middle portion of the second inner tube 35 so as to be disposed opposite to the outward flange 34. The outer circumference 35b of one axial end of the second inner tube 35 is formed in a reduced diameter to form an annular groove 40 between the outward flanges 34 and 39, while the diameter of the outer circumference 35c of the other end portion thereof is the same with that of the outer circumference 27c of the first inner tube 27.

An outer tube 41 is mounted through a pair of elastic annular blocks 42 and 43 on the first inner tube 27 and the second inner tube 35. An inward protrusion 44 is formed integrally with the outer tube 41 in the axially middle portion thereof. The inward protrusion 44 is protruded into the annular groove 40 so as to form an annular gap 44' between the outer circumference 35b of one end portion of the second inner tube 35 and the inner circumference of the inward protrusion 44. A pair of tubular parts 41a and 41b are formed in the axially opposite end portions of the outer tube 41. A first annular room 45 is formed between the inner circumference 41'a of the tubular part 41a and the outer circumference 27c of the first inner tube 27, while a second annular room 46 is formed between the inner circumference 41'b of the tubular part 41b and the outer circumference 35c of the second inner tube 35.

An outward flange 47 is formed integrally with the outer tube 41 in the axially middle portion thereof. A sprocket wheel 48 is secured with bolts 49 to the outward flange 47.

The pair of elastic blocks 42 and 43 are formed by fixing integral annular elastic members 42c and 43c through baking or press fit between the inner members 42a and 43a and the outer members 42b and 43b, respectively. The inner member 42a and the outer member 42b, and the inner member 43a and the outer member 43b are press-fit in the first annular room 45 and in the second annular room 46, respectively.

Small holes 50 and 51 and large holes 52 are formed in alignment with each other in the outward flanges 34 and 39 and the inward protrusion 44, respectively, at a fixed circumferential interval. A bush 53 is press-fit in each large hole 52. A pin 54 is fitted through the corresponding small holes 50 and 51. The pin 54 extends through the bush 53.

Oil supplied through an oil hole 56 is sealed in the annular gap 44'.

The torque of the driving shaft 20 is transmitted from the power transmission member 22 through the first inner tube 27 and the second inner tube 35, then through a pair of the elastic blocks 42 and 43 and then through the outer tube 41 to the sprocket wheel 48 to drive the endless track.

Figure 4:
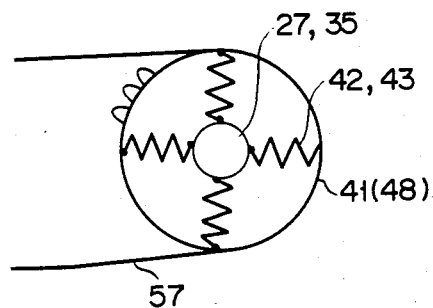
FIGS. 4 to 7 are explanatory representations explaining the operating modes of the sprocket wheel assembly of FIG. 1.

While the vehicle remains stationary, the elastic blocks 42 and 43 are not displaced as illustrated in FIG. 4. Reference numeral 57 designates the endless track.

Figure 5:
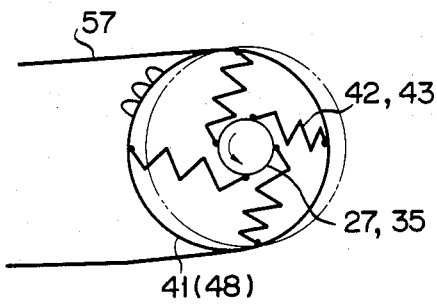
Figure 6:
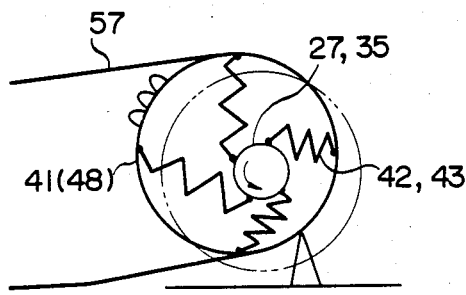
Figure 7:
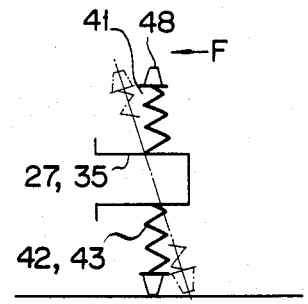

While the vehicle is in tractive operation (running mode) and while the recoil spring is in operation (when the tension of the endless track is changed), the elastic blocks 42 and 43 are displaced as illustrated in FIG. 5. The elastic blocks 42 and 43 are displaced as illustrated in FIG. 6 when the vehicle runs on an obstacle B and an impulsive force is applied to the sprocket wheel, as illustrated in FIG. 7 when a thrust force F is applied to the sprocket wheel 48.

Thus the elastic blocks 42 and 43 are compressed to absorb energy when the torque varies. Impulsive force applied to the sprocket wheel from the ground is absorbed through compression and shearing.

Since torque variation and impulsive force are absorbed and mitigated, the life of the vehicle and the riding condition are improved and at the same time, noise is reduced.

When a great impulsive force is applied to the sprocket wheel and the elastic blocks 42 and 43, thereby, are compressed and dislocated to the utmost extent, the inward protrusion 44 comes into abutment with the outer circumference 35b of the second inner tube 35 and the inside surface of the bush 53 comes into abutment with the pin 54 to restrict the further compression and the dislocation of the elastic blocks 42 and 43.

The pins 54 and the bushes 53 constitute the restricting mechanism for restricting the dislocation of the elastic blocks within a fixed extent.

The tractive torque is transmitted through the elastic members 42c and 43c to the outer tube 41 to a certain extent; however, the inside surfaces of the bushes 53 come into abutment with the pins 54 when the elastic members 42c and 43c of the elastic blocks 42 and 43 respectively are strained greatly and thereafter, the tractive torque is transmitted directly to the sprocket wheel 48 through the first inner tube 27, the second inner tube 35, the bushes 53, the pins 54 and then through the outer tube 41. Consequently, a large torque can be transmitted to the sprocket wheel 48 to provide a large tractive force.

Furthermore, since the elastic blocks 42 and 43 are mounted between the first inner tube 27 and the outer tube 41 and between the second inner tube 35 and the outer tube 41 at the axially opposite ends, respectively, of the outer tube 41 and the sprocket wheel 48 is attached to the outer tube 41 at the axially middle portion of the outer tube 41, the radial load applied to the sprocket wheel 48 is distributed practically equally through the outer tube 41 to a pair of the elastic blocks 42 and 43.

Accordingly, the outer tube 41 moves up and down in a stable position without being tilted with respect to the axis of the driving shaft and hence the flanges 34, 39 and the protrusion 44 do not interfere with each other in the vicinity of the pins 54 and the irregular engagement of the sprocket wheel 48 with the endless track resulting from the tilting of the sprocket wheel 48 is prevented.

Still further, since the first inner tube 27 is coupled by means of splines with the power transmission member 22 coupled with the driving shaft 20 and the second inner tube 35 is secured with bolts 36 to the first inner tube 27 and is supported through the bearing 38 by the case 37 of the final reduction gear, the tractive force is received by the splines of the first inner tube 27 and approximately a half of the total tractive force is received by the bolts 36, therefore, the bolts 36 are less likely to be damaged.

The oil contained in the gap 44' is sealed with the elastic members 42c and 43c, each of which is formed in a single annular form, of the elastic blocks 42 and 43 and hence the oil never leaks outside.

Furthermore, since the elastic members 42c and 43c of the elastic blocks 42 and 43, respectively, are preloaded by press-fitting the elastic members 42c and 43c between the inner members 42a and 43a and the outer members 42b and 43b respectively, the first room 45 and the second room 46 formed between the inner tubes 27 and 35 and the outer tube 41 need not be formed of taper surfaces, but may be formed of parallel surfaces.

Accordingly, the work for machining the parts as well as the work for assembling the elastic blocks 42 and 43 are facilitated.

Since the restricting mechanism is constituted by interposing the inward protrusion 44 between a pair of the outward flanges 34 and 39, inserting the pins 54 extended between the outward flanges 34 and 39 through the corresponding bushes 53 provided in the inward protrusion 44 with the gap 55 between the pin and the bush, the bushes 53 and the corresponding pins 54 are brought into abutment when an impulsive force is applied to the sprocket wheel assembly; therefore, only the pin 54 and/or the bush 53 need be replaced with new one through the simple and easy work for replacement, when the pin 54 and/or the bush 53 is damaged.

Furthermore, only the holes 50 and 51 need be drilled in the outward flanges 34 and 39 respectively, therefore, the machining work is facilitated as compared with the machining work for the conventional sprocket wheel assembly, in which recesses need be formed in the parts thereof.

Figure 8:
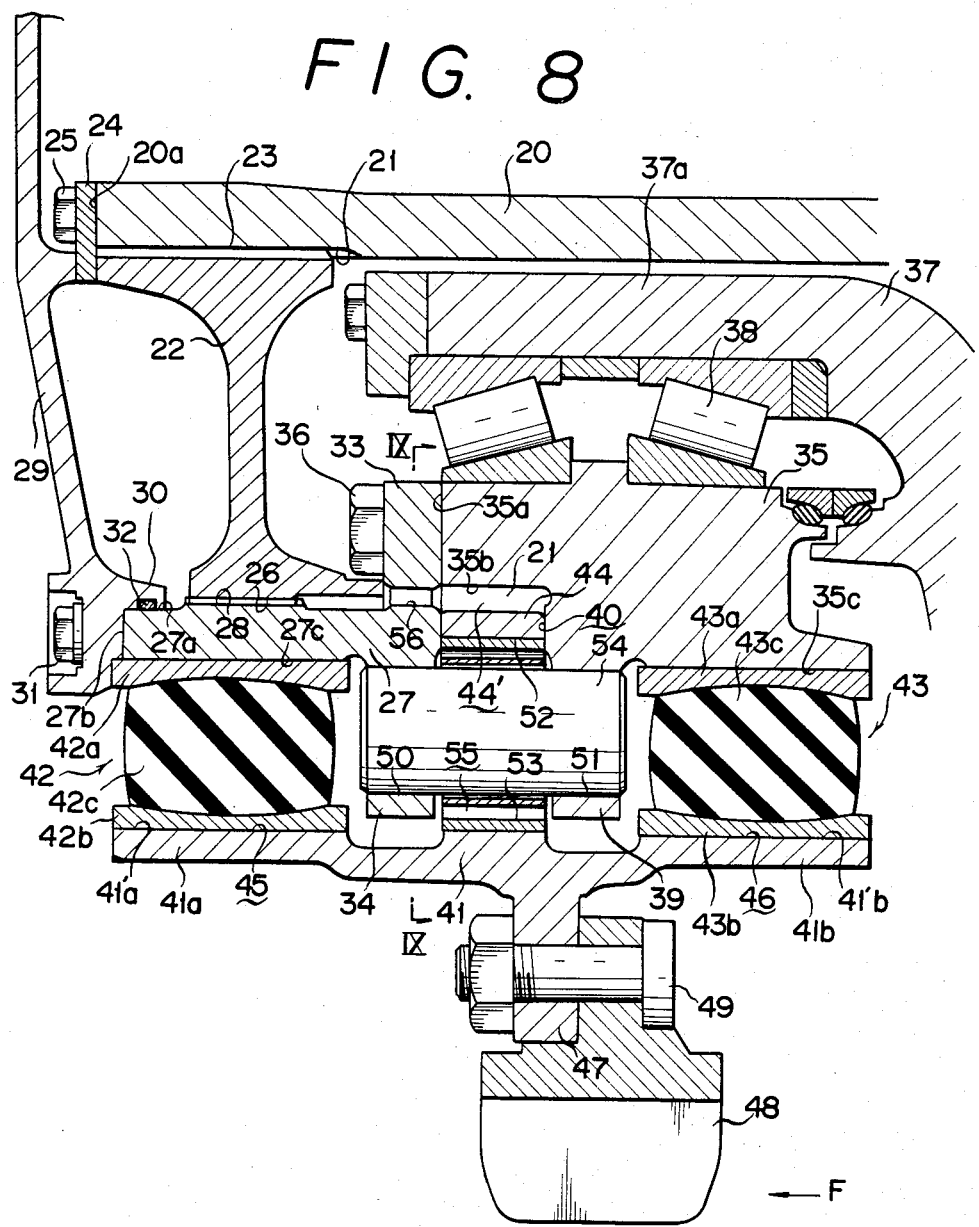
FIG. 8 is semilar to FIG. 1 but showing another embodiment of the present invention.

Reference is now made to FIGS. 8 and 9 showing another embodiment of the present invention. In this embodiment, a floating bush 57 is rotatably mounted on each pin 54 defining a gap 55' between the bush 53 and the floating bush 57. All the other constructions of this embodiment are same as those of first mentioned embodiment.

Accordingly, when an upward external force is applied to the sprocket wheel while the pins 54 are in contact through the floating bushes 57 with the bushes 53, by the agency of a tractive force, since each floating bush 57 is rotatable relative to the corresponding pin 54, the floating bush 57 rolls under a large contact pressure, and hence excessive force will not act on the pins 54, the floating bushes 57 and the bushes 53, so that the durability of the pins 54, the floating bushes 57 and the bushes 53 is improved and furthermore, since the respective parts of contact between the floating bushes 57 and the bushes 53 and between the floating bushes 57 and the pins 54 vary continuously, partial and local wear will not occur in the floating bushes 57, the bushes 53 and the pins 54.

As described hereinbefore, the device according to the present invention is capable of absorbing impulsive force by the elastic blocks 42 and 43 and hence effectively improves the life of the vehicle and the riding condition and reduces noises.

Furthermore, since an upward thrusting load exerted on the sprocket wheel 48 is evenly distributed to a pair of the elastic blocks 42 and 43, the sprocket wheel 48 will not be tilted with respect to the axis of the driving shaft when an upward thrusting force is exerted on the sprocket wheel 48 and is allowed to move up and down stably.

Accordingly, the interference between the inner tubes and the outer tube in the section of the restricting mechanism is prevented.

Furthermore, since the first inner tube 27 and the second inner tube 35 are joined together, the first inner tube 27 is coupled with the driving shaft 20 and the second inner tube 35 is supported through a bearing 38 by the case 37 of the final reduction gear, small and light component parts are available and only moderate coupling strength is sufficient and hence the assembling work is facilitated.

In the second embodiment, since the floating bush 57 is rotatably mounted on each pin 54 of the restricting mechanism and the pin 54 contacts the bush 53 through the floating bush 57, the durability of the restricting mechanism is improved and the local and partial wear of the bushes 53, the pins 54 and the floating bush 57 will not occur.

While the invention has been described and shown with particular reference to the preferred embodiments, it will be apparent that variations might be possible that would fall within the scope of the present invention which is not intended to be limited except as defined in the following claims.

What is claimed is:

1. A sprocket wheel assembly of a crawler vehicle including a drive shaft and a final reduction gear casing, comprising:
   a first inner tube mounted on said drive shaft, said first inner tube having formed therein at one end thereof a flange extending radially inwardly and outwardly, said flange having formed therein a plurality of first holes in the outwardly extending flange portion;
   a second inner tube rotatably mounted on said final drive gear casing, said second inner tube being fixedly connected with said first inner tube and having formed therein a flange extending radially outwardly, the flange of said second inner tube having formed therein a plurality of second holes each being in register with said respective first holes;
   an outer tube disposed so as to extend outer circumferences of said first and second inner tubes, said outer tube having a first cylindrical section formed at one end thereof, a second cylindrical section formed at the other end thereof, a protrusion extending radially inwardly from an intermediate section thereof, and a flange extending radially outwardly from the intermediate section thereof, said protrusion being adapted to be inserted between the flanges of said first and second inner tubes and having formed therein a plurality of third holes each being in register with said respective first and second holes, diameter of said third holes being made larger than that of said first and second holes;
   a first elastic annular block unit interposed between said first inner tube and the first cylindrical section of said outer tube;
   a second elastic annular block unit interposed between said second inner tube and the second cylindrical section of said outer tube;
   a sprocket wheel fixedly monted to the flange of said outer tube; and
   a plurality of pins each inserted into said respective first and second holes across said third holes defining an annular gap between the outer periphery of each of said pins and the inner periphery of each of said third holes.

2. A sprocket wheel assembly according to claim 1 wherein said second inner tube is fixedly connected to said first inner tube by means of bolts.

3. A sprocket wheel assembly according to claim 1 wherein each of said first and second elastic annular block units comprises an inner ring, an outer ring and annular elastic members sandwiched between said inner and outer rings.

4. A sprocket wheel assembly according to claim 1 wherein a bush is press fit within said respective third holes.

5. A sprocket wheel assembly according to claim 4 further comprising a floating bush rotatably mounted on said respective pins.

* * * * *